US012774092B2

(12) United States Patent
Mayfield et al.

(10) Patent No.: US 12,774,092 B2
(45) Date of Patent: Oct. 27, 2026

(54) ADVANCED HELMET VEHICLE INTERFACE CONNECTOR WITH EXPLOSIVE ATMOSPHERE PROTECTION

(71) Applicant: Rockwell Collins, Inc., Cedar Rapids, IA (US)

(72) Inventors: James Mayfield, Cedar Rapids, IA (US); Timothy Fannin, Urbana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 353 days.

(21) Appl. No.: 18/677,164

(22) Filed: May 29, 2024

(65) Prior Publication Data

US 2025/0368329 A1 Dec. 4, 2025

(51) Int. Cl.
*H01R 13/627* (2006.01)
*B64D 10/00* (2006.01)
*H01R 13/527* (2006.01)

(52) U.S. Cl.
CPC ........... *B64D 10/00* (2013.01); *H01R 13/527* (2013.01); *H01R 13/6276* (2013.01)

(58) Field of Classification Search
CPC .. B64D 10/00; H01R 13/527; H01R 13/6276; H01R 13/703; H01R 13/66; H01R 13/639
See application file for complete search history.

(56) References Cited

U.S. PATENT DOCUMENTS

| | | | |
|---|---|---|---|
| 3,659,250 A | 4/1972 | Horton | |
| 4,629,272 A | 12/1986 | Mattingly et al. | |
| 9,088,109 B2 | 7/2015 | Little et al. | |
| 9,202,650 B2 | 12/2015 | Merrifield et al. | |
| 9,559,459 B2 | 1/2017 | Jozwik et al. | |
| 10,199,767 B2 | 2/2019 | Hopf | |
| 10,673,179 B1 * | 6/2020 | Harris | H01R 13/6691 |
| 10,707,605 B2 * | 7/2020 | Kloss | H01R 4/50 |
| 2022/0302647 A1 | 9/2022 | Koseck et al. | |
| 2022/0320794 A1 | 10/2022 | Bertsch | |

FOREIGN PATENT DOCUMENTS

| | | | | |
|---|---|---|---|---|
| CA | 2843822 C | 10/2016 | | |
| EP | 0334610 A1 * | 9/1989 | | H01R 13/629 |
| EP | 3513464 B1 | 10/2022 | | |
| GB | 1125198 A | 8/1968 | | |
| WO | 2007071968 A3 | 6/2007 | | |
| WO | WO-2007071968 A2 * | 6/2007 | | H01R 13/6276 |

* cited by examiner

*Primary Examiner* — Leah Macchiarolo
(74) *Attorney, Agent, or Firm* — Suiter Swantz IP

(57) ABSTRACT

A system may include a first connector side configured to engage with a second connector side, the first connector side comprising: an inner plug ring comprising a first set of first connector elements configured to engage a first set of second connector elements of the second connector side; and an outer plug ring comprising a set of contacts, wherein the set of contacts is configured to close a safety circuit with at least one of the first device or the second device when the first set of first connector elements engage the first set of second connector elements, whereupon disengaging the first connector side from the second connector side, the safety circuit is opened by a movement of at least one contact of the set of contacts before the first set of first connector elements disengage the first set of second connector elements.

20 Claims, 13 Drawing Sheets

ADVANCED HELMET VEHICLE INTERFACE CONNECTOR WITH EXPLOSIVE ATMOSPHERE PROTECTION

BACKGROUND

Aircraft cockpit electrical systems such as flight helmet systems often have requirements that the cables transmitting power, video, and signals to and from the helmet be easily disconnected for pilot egress from the aircraft. In some instances (e.g., after an aircraft malfunction or crash) the cockpit may be in an explosive atmosphere due to the presence of fuel vapor or other combustible gases. However, if a pilot disconnects the cabling leading from the helmet to the flight helmet system, the sudden disconnect of an energized line may lead to sparking that can ignite the explosive environment.

Therefore, there is a need for a connector or connector system that allows an electrical cable to be quickly connected in an explosive atmosphere without risk of explosion.

SUMMARY

In some aspects, the techniques described herein relate to a system including: a connector assembly configured to electrically couple a first device with a second device, the connector assembly including: a first connector side configured to engage with a second connector side, the first connector side including: an inner plug ring including a first set of first connector elements configured to engage a first set of second connector elements of the second connector side; and an outer plug ring including a set of contacts, wherein the set of contacts is configured to close a safety circuit with at least one of the first device or the second device when the first set of first connector elements engage the first set of second connector elements, whereupon disengaging the first connector side from the second connector side, the safety circuit is opened by a movement of at least one contact of the set of contacts before the first set of first connector elements disengage the first set of second connector elements.

In some aspects, the techniques described herein relate to a system, wherein the safety circuit is a low voltage circuit that is monitored by at least one of the first device or the second device, wherein an opening of the safety circuit is detectable by the at least one of the first device or second device, wherein the at least one of the first device or the second device are configured to turn off power to the first set of first connector elements upon detecting an opening of the safety circuit.

In some aspects, the techniques described herein relate to a system, wherein power to the first set of first connector elements is turned off before the first set of first connector elements physically disengages the first set of second connector elements.

In some aspects, the techniques described herein relate to a system, wherein an opening of the safety circuit by the movement of the at least one contact of the set of contacts will not cause an explosion in an explosive atmospheric environment.

In some aspects, the techniques described herein relate to a system, wherein the outer plug ring is configured to rotate relative to the inner plug ring, wherein a rotation of the outer plug ring articulates the at least one contact of the set of contacts from a closed position to an open position.

In some aspects, the techniques described herein relate to a system, wherein the outer plug ring and an outer receptacle ring of the second connector side are configured to engage via a screw thread after the first set of first connector elements engages the first set of second connector elements, wherein engaging the screw thread articulates the at least one contact of the set of contacts from the open position to the closed position.

In some aspects, the techniques described herein relate to a system, wherein applying tension between an engaged first connector side and second connector side causes the articulation of the at least one contact from the closed position to the open position.

In some aspects, the techniques described herein relate to a system, wherein the first connector side further includes a manually pressable button mechanically coupled to the at least one contact of the set of contacts, wherein pressing the button biases the at least one contact of the set of contacts from a closed position to an open position.

In some aspects, the techniques described herein relate to a system, wherein at least one contact of the set of contacts includes a first safety element that engages a second safety element of the second connector side, where a length of insertion of the first safety element into the second safety element is less than a length of insertion of the first set of first connector elements with the first set of second connector elements.

In some aspects, the techniques described herein relate to a system, where the connector assembly is configured to replace a D38999 insert while retaining the functionality of the replaced D38999 insert.

In some aspects, the techniques described herein relate to a system, further including the second connector side.

In some aspects, the techniques described herein relate to a system, further including at least one of the first device or the second device.

In some aspects, the techniques described herein relate to a system, wherein the at least one of the first device or the second device further includes a controller communicatively coupled to the safety circuit and the first set of first connector elements, the controller including one or more processors, wherein the one or more processors are configured to execute a set of program instructions stored in memory, the set of program instructions configured to cause the one or more processors to: detect a status of the safety circuit; and upon a detection of an open safety circuit, turn off power to the first set of first connector elements.

In some aspects, the techniques described herein relate to a system, wherein the at least one of the first device or the second device includes a helmet vehicle interface.

In some aspects, the techniques described herein relate to an electrical system including: a first device; a second device, wherein the at least one of the first device or the second device further includes a controller communicatively coupled to a safety circuit and a first set of first connector elements, the controller including one or more processors, wherein the one or more processors are configured to execute a set of program instructions stored in memory; a connector assembly configured to electrically couple the first device with the second device, the connector assembly including: a first connector side configured to engage with a second connector side, the first connector side including: an inner plug ring including the first set of first connector elements configured to engage a first set of second connector elements of the second connector side; and an outer plug ring including a set of contacts, wherein the set of contacts are configured to close the safety circuit with at least one of the first device or the second device when the first set of first connector elements engage the first set of second connector elements, whereupon disengaging the first connector side from the second connector side, the safety circuit is opened by a movement of at least one contact of the set of contacts before the first set of first connector elements disengage the first set of second connector elements, wherein the set of program instructions configured to cause the one or more processors to: detect a status of the safety circuit; and upon a detection of an open safety circuit, turn off power to the first set of first connector elements.

In some aspects, the techniques described herein relate to an electrical system, wherein the safety circuit is a low voltage circuit, wherein power to the first set of first connector elements is turned off before the first set of first connector elements physically disengage the first set of second connector elements, wherein an opening of the safety circuit by the movement of the at least one contact of the set of contacts will not cause an explosion in an explosive atmospheric environment.

In some aspects, the techniques described herein relate to an electrical system, wherein the outer plug ring is configured to rotate relative to the inner plug ring, wherein a rotation of the outer plug ring articulates the at least one contact of the set of contacts from a closed position to an open position, wherein the outer plug ring and an outer receptacle ring are configured to engage via a screw thread after the first set of first connector elements engages the first set of second connector elements, wherein engaging the screw thread articulates the at least one contact of the set of contacts from the open position to the closed position, wherein applying tension to an engaged first connector side and second connector side causes a disengaging of the screw thread and an articulation of the at least one contact from the closed position to the open position.

In some aspects, the techniques described herein relate to an electrical system, wherein the first connector side further includes a manually pressable button mechanically coupled to the at least one contact of the set of contacts, wherein pressing the button biases the at least one contact of the set of contacts from a closed position to an open position.

In some aspects, the techniques described herein relate to an electrical system, wherein at least one contact of the set of contacts includes a first safety element that is that engages a second safety element of the second connector side, where a length of insertion of the first safety element into the second safety element is less than a length of insertion of the first set of first connector elements with the first set of second connector elements.

In some aspects, the techniques described herein relate to a method for preventing an explosion when disengaging a connector assembly in an explosive atmosphere including: obtaining a connector assembly electrically coupled to a first device and a second device, the connector assembly including: a first connector side including a first set of first connector elements; a second connector side including a first set of second connector elements slidably coupled to the first set of first connector elements; and a set of contacts configured to close a safety circuit with at least one of the first device or the second device; providing a tension between the first connector side and the second connector side of the coupled connector assembly, wherein providing the tension causes the set of contacts to move, opening the safety circuit; detecting an open safety circuit by at least one of the first device or second device; de-energizing the first set of first connector elements by at least one of the first device or second device; and providing more tension between the first connector side and the second connector side, wherein providing more tension disengages the first set of first connector elements from the first set of second connector elements.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
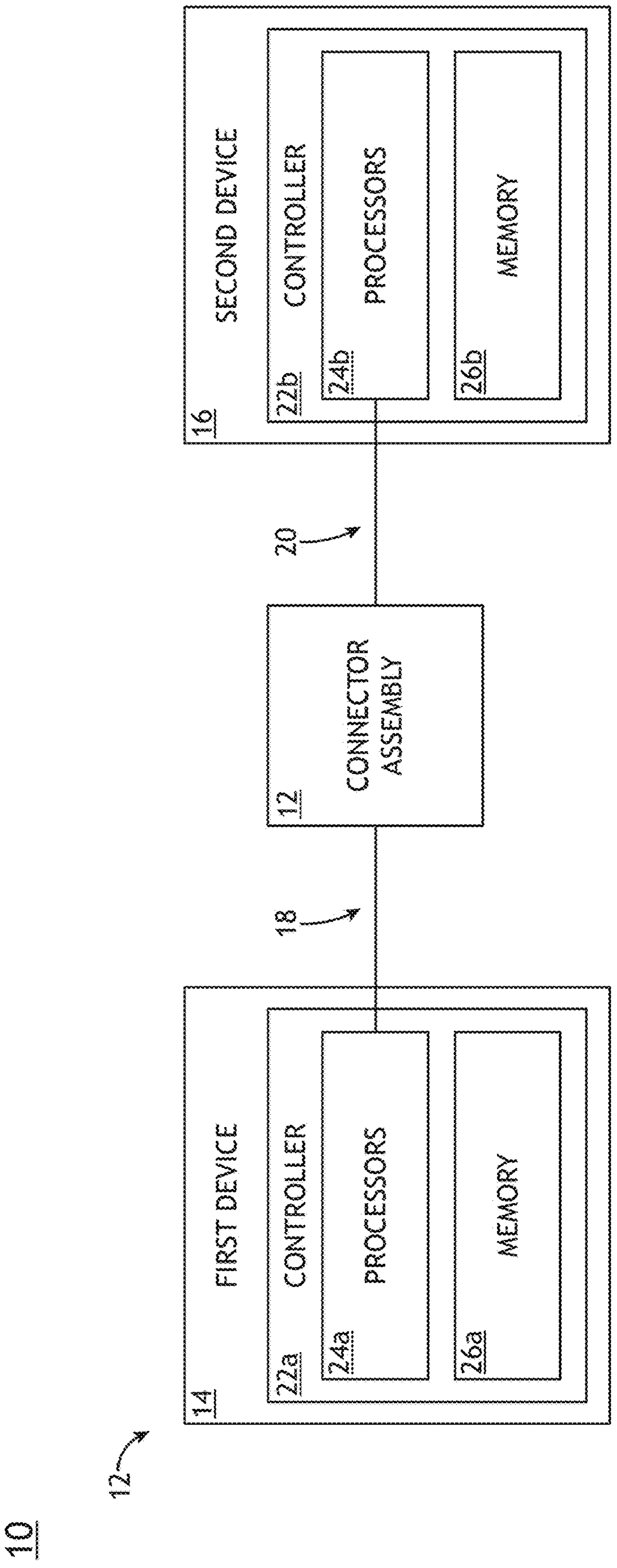
FIG. 1A illustrates a block diagram of a system for controlling sparking and ignition in an explosive atmosphere, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Reference will now be made in detail to the subject matter disclosed, which is illustrated in the accompanying drawings.

FIGS. 1A-7 illustrate an electrical connector assembly configured to electrically couple a first device to a second device that can be safely disconnected in an explosive atmosphere. The electrical connector includes a connector plug containing a first set of pins, and a connector receptacle containing a first set of sockets configured to receive the first set of pins when the connector plug and the connector receptacle are engaged (e.g., plugged together). The connector plug and/or connector receptacle also includes a set of contacts that are configured to close a safety circuit between the electrical connector and the first device and/or the second device when the first set of pins is coupled to the first set of sockets. When the connector plug and the connector receptacle are in the process of being disengaged (e.g., unplugged), the safety circuit is opened (e.g., broken) before the first set of pins disengage the first set of sockets. Electronic circuitry on either the first device or the second device detects the open safety circuit and shuts down, or de-energizes electrical power along the connector so that when the first set of pins are released from the first set of sockets, no electrical power is present that could cause sparks that ignite the explosive atmosphere. A system that includes the electrical connector, and a method for using the electrical connector are also disclosed.

Figure 1B:
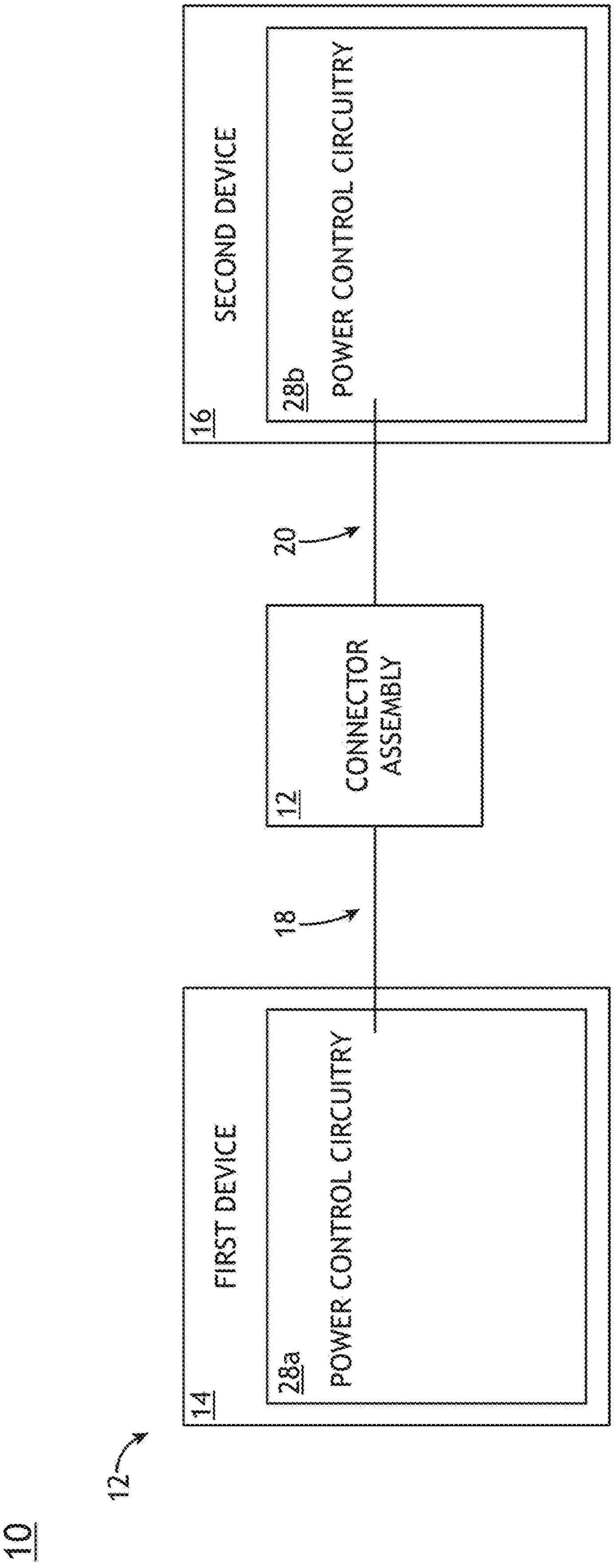
FIG. 1B illustrates a block diagram of a system for controlling sparking and ignition in an explosive atmosphere, in accordance with one or more embodiments of the disclosure.

FIG. 1A illustrates a block diagram of a system 10 for controlling sparking and ignition in an explosive atmosphere, in accordance with one or more embodiments of the disclosure. For example, the system 10 includes a connector assembly 12 that electrically couples a first device 14 to a second device 16 via a first cable 18 and a second cable 20. The first device 14 and/or second device 16 may include one or more respective controllers 22*a-b* that are electrically coupled to the connector assembly 12. In embodiments, the controllers 22*a-b* include one or more respective processors 24*a-b* and memory 26*a-b*. For example, the memory 26*a-b* may maintain program instructions configured to cause the one or more processors 24*a-b* to carry out any of the one or more process steps described throughout the present disclosure. For instance, the one or more processors 24-*a-b* may be instructed to detect and/or report a safety circuit status (e.g., an open safety circuit or a closed safety circuit). In another instance, the one or more processors 24*a-b* may be instructed to turn off power to the first device 14 and/or second device if an open safety circuit is detected. The system 10 may include one or more of the connector assembly 12 or a component of the connector assembly 12, the first cable 18, the second cable 20, the first device, 14 and/or the second device 16. While FIG. 1A illustrates the system 10 having one or more controllers 22*a-b* utilizing one or more processors 24*a-b*, the system to perform one or more steps described herein, the one or more steps may also be performed via a more general circuitry instead of a semiconductor-based processor (e.g., using a cutoff switch). In embodiments, first device 14 and/or the second device 16 include respective power control circuitry 28*a-b* that perform the one or more process steps described throughout the disclosure, without relying on memory 26*a-b* or complex processors 24*a-b*, as shown in FIG. 1B.

The system 10 may include, or be integrated within, any electrical system that includes a first device 14 and the second device that are electrically and/or communicatively coupled. For example, the system 10 may include or be integrated within an electrical system of a vehicle (e.g., automobile, aircraft, train, boat). For instance, the system 10 may include or be integrated within a commercial jet or fighter jet.

The first device 14 and the second device 16 may include any devices in electrical communication with each other. For example, the first device and the second device may each include, but not be limited to, a control panel, a power source, a radio, a speaker, a helmet-worn display (HWM), or other interface devices. For instance, the first device 14 may include a helmet-vehicle interface (HVI), and the second device 16 may include a control panel or a line replaceable unit (LRU) configured to communicate with and/or power the HVI. In another instance, the first device 14 may include an HVI and the second device 16 may include a battery.

Figure 1C:
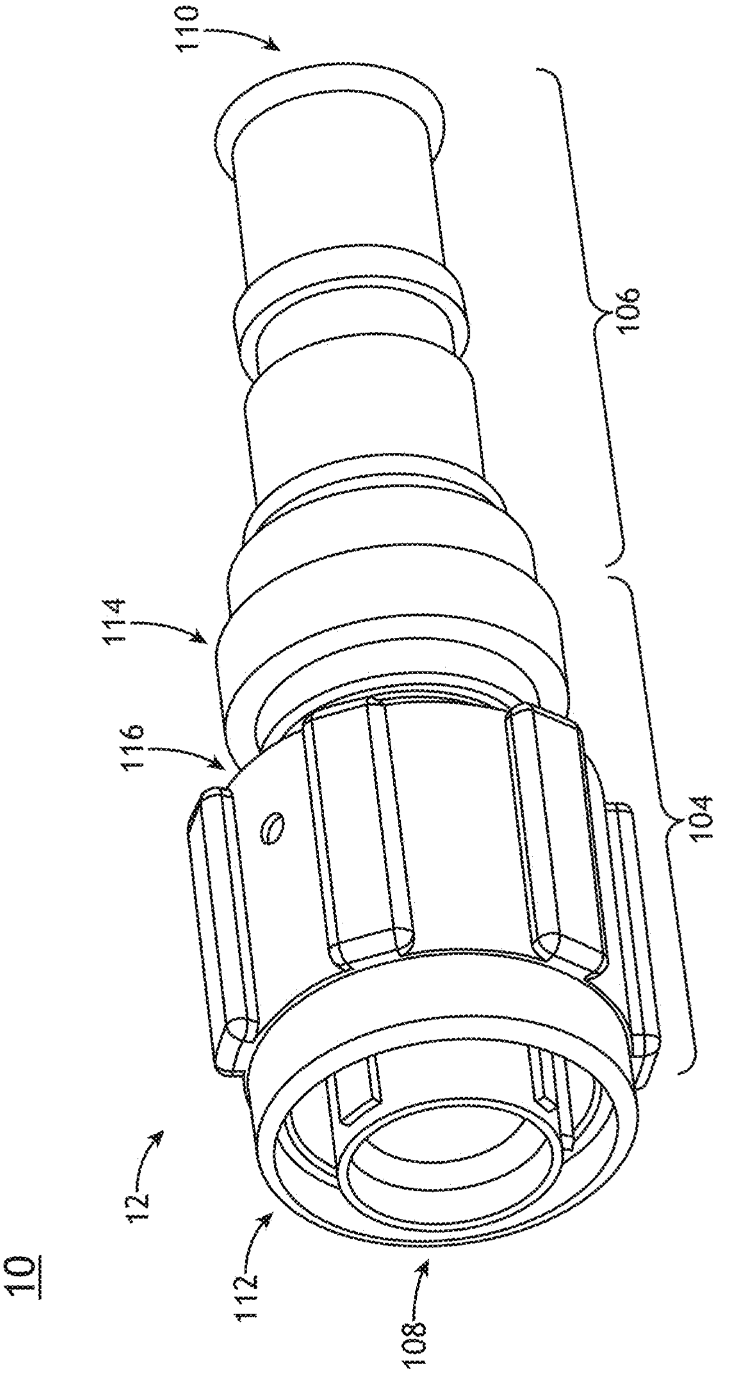
FIG. 1C illustrates a perspective view of the system containing a connector assembly in accordance with one or more embodiments of the disclosure.

FIG. 1C illustrates a perspective view of the system 10 containing a connector assembly 12 in accordance with one or more embodiments of the disclosure. The connector assembly 12 may include a first connector side (e.g., connector plug 104) and a second connector side (connector receptacle 106), with the connector plug 104 configured to engage the connector receptacle 106. The connector plug 104 includes an inner plug housing 108 that couples to an inner receptacle housing 110 (hidden from view in FIG. 1C, but shown in FIG. 2A) and an outer plug housing 112 that couples to an outer receptacle housing 114 (e.g., via threads 116, interference fit, or other coupling mechanism). One or more of the outer plug housings may be able to rotate relative to their respective inner housing. For example, the outer plug housing 112 may be configured to rotate relative to the inner plug housing 108. The connector assembly 12 may include other types of first connector sides and second connector sides other than the respective connector plug 104 and connector receptacle 106. For example, the connector may include genderless connectors or other connectors that do not have obvious plug and receptacle aspects. Therefore, the above description should not be interpreted as a limitation of the present disclosure, but merely as an illustration.

It should be understood that the connector assembly 12 may include electrical connection assemblies of various types, form factors, and functions. Therefore, the above description should not be interpreted as a limitation of the present disclosure, but merely an illustration. For example, and in embodiments, the connector assembly 12 may include componentry (e.g., connector housings) that are substantially similar to, conform to, and/or are in compliance with, EN4165, ARINC 600, EN3545, EN4644, SAE AS50151, D22992, D26482, or D38999 inserts. For instance, the connector assembly 12 may have a mating interface that is in compliance with a MIL-DTL-38999 specification. In another instance, the connector assembly may be configured to replace a D38999 insert, while retaining the functionality of the replaced D38999 insert.

In another example, and in embodiments, the connector assembly 12 may include componentry that are substantially similar to, conform to, and/or are in compliance with quick disconnect connectors (QDC). QDCs have quick disconnect mechanisms that include, but are not limited to, push-pull mechanisms, pull-only mechanisms, push-button mechanisms, screw-based mechanisms that require a small amount of rotation (e.g., a quarter-turn) for release. For example, the connector assembly 12 may include a QDC pull-type mechanism that includes a lanyard, where pulling on the lanyard disengages the connector assembly. Styles and shapes of connector assemblies 12, including QDC-type connector assemblies, may be similar to those vended by the Amphenol, TE Connectivity, and/or Glenair companies.

Figure 2A:
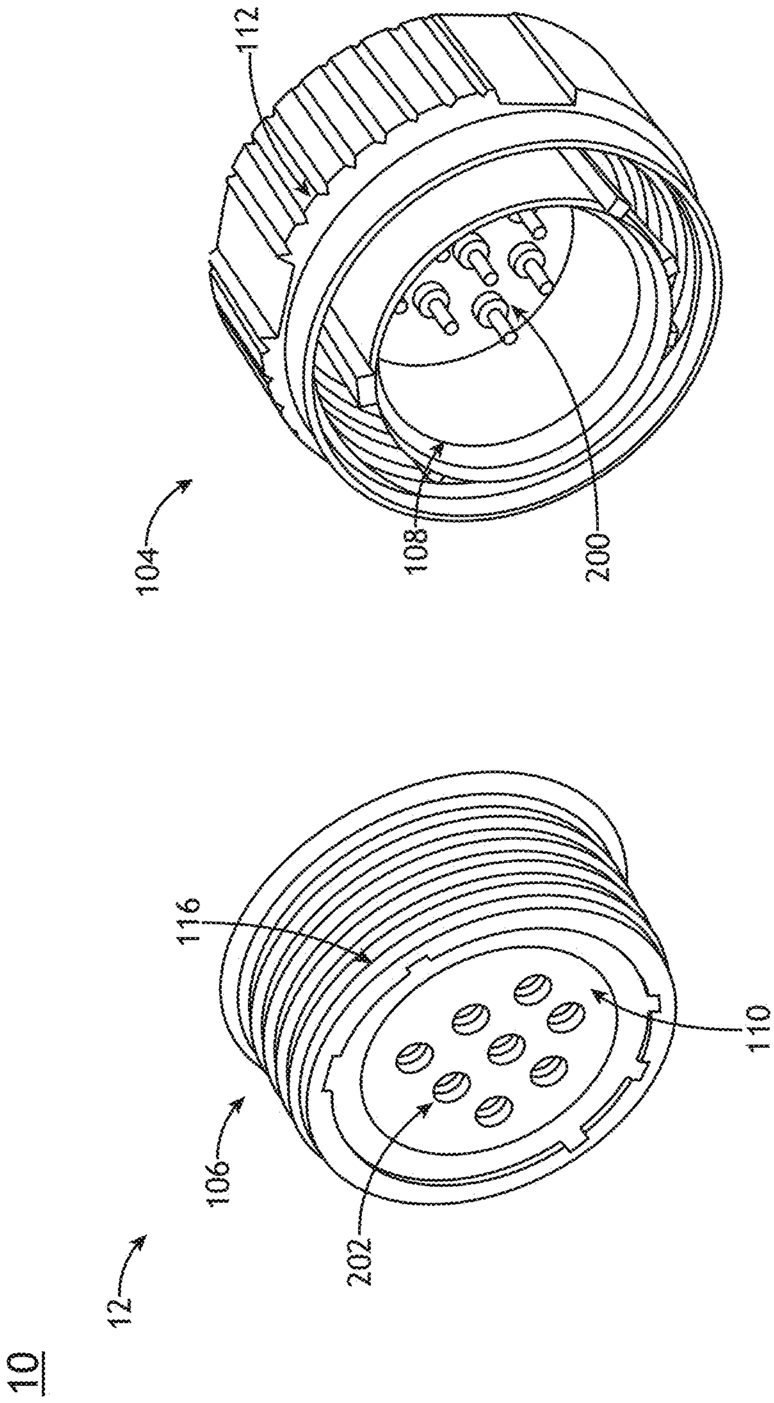
FIG. 2A illustrates a perspective view of the connector plug disengaged from the connector receptacle, in accordance with one or more embodiments of the disclosure.

FIG. 2A illustrates a perspective view of the connector plug 104 disengaged from the connector receptacle 106, in accordance with one or more embodiments of the disclosure. In embodiments, the connector plug 104 includes a set of first connector elements (e.g., a first set of pins 200) configured to engage, such slidably engage, a set of second connector elements (e.g., a first set of sockets 202) on the connector receptacle 106. The connector plug 104 and the connector receptacle 206 may include any number, type, or arrangement of pins and sockets, respectively. The engagement of the first set of pins 200 with the first set of sockets 202 allows power and/or data signals to be transferred between the first device 14 and the second device 16. The connector assembly 12 may include other types of first connector elements and second connector elements other than the respective first set of pins 200 and second set of pins 102. For example, the connector elements may include other types of connector elements including, but not limited to, pins sets that reversibly interact or couple with pad sets. Therefore, the above description should not be interpreted as a limitation of the present disclosure, but merely as an illustration.

Figure 2B:
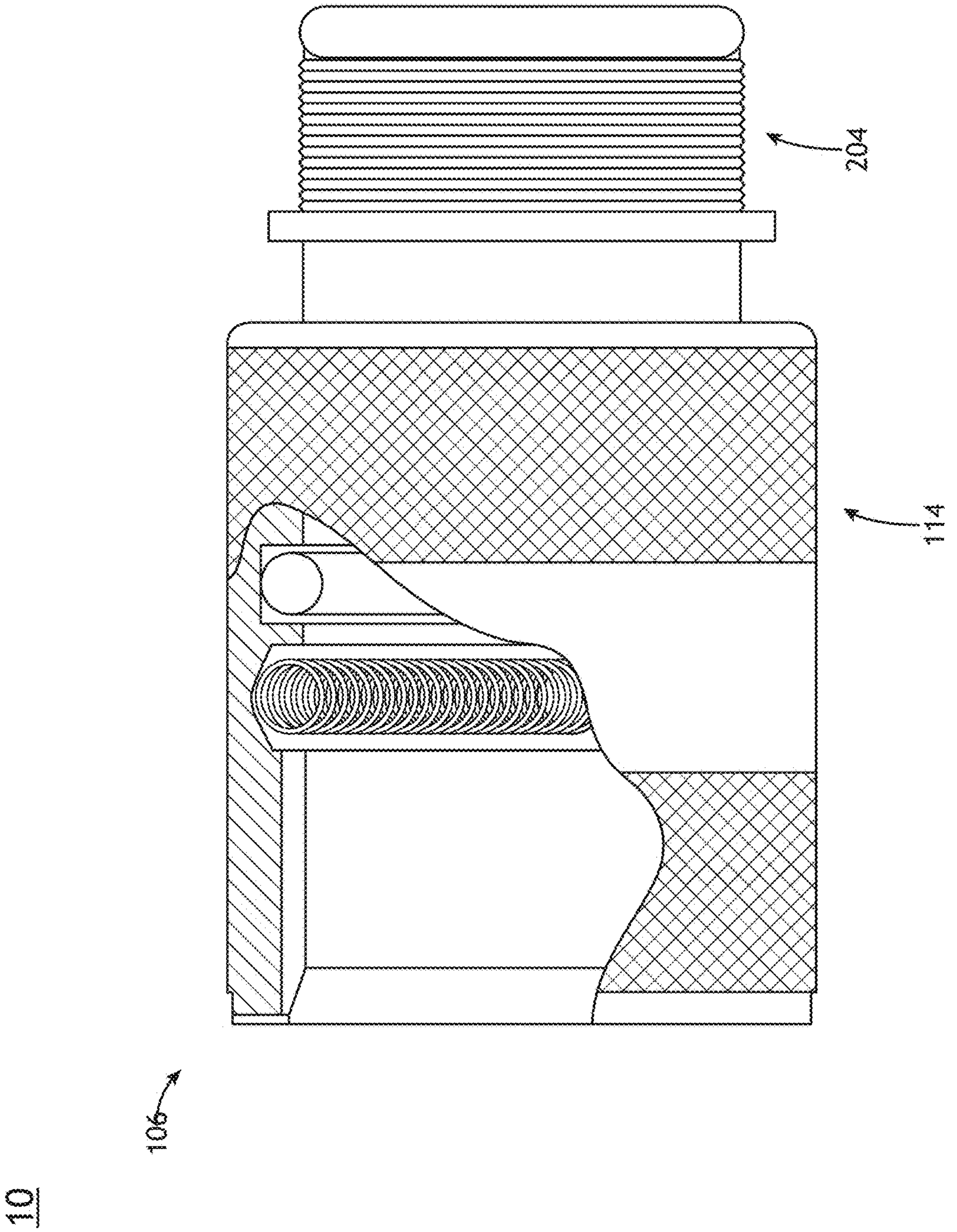
FIG. 2B illustrates a side view of a QDC-style connector receptacle, in accordance with one or more embodiments of the disclosure.

A side view of a QDC-style connector receptacle 106 (e.g., a push/pull type) is shown in FIG. 2B. The connector receptacle may include retention rings 204 that function to keep the connector receptacle 106 engaged with the connector plug 104.

Figure 3A:
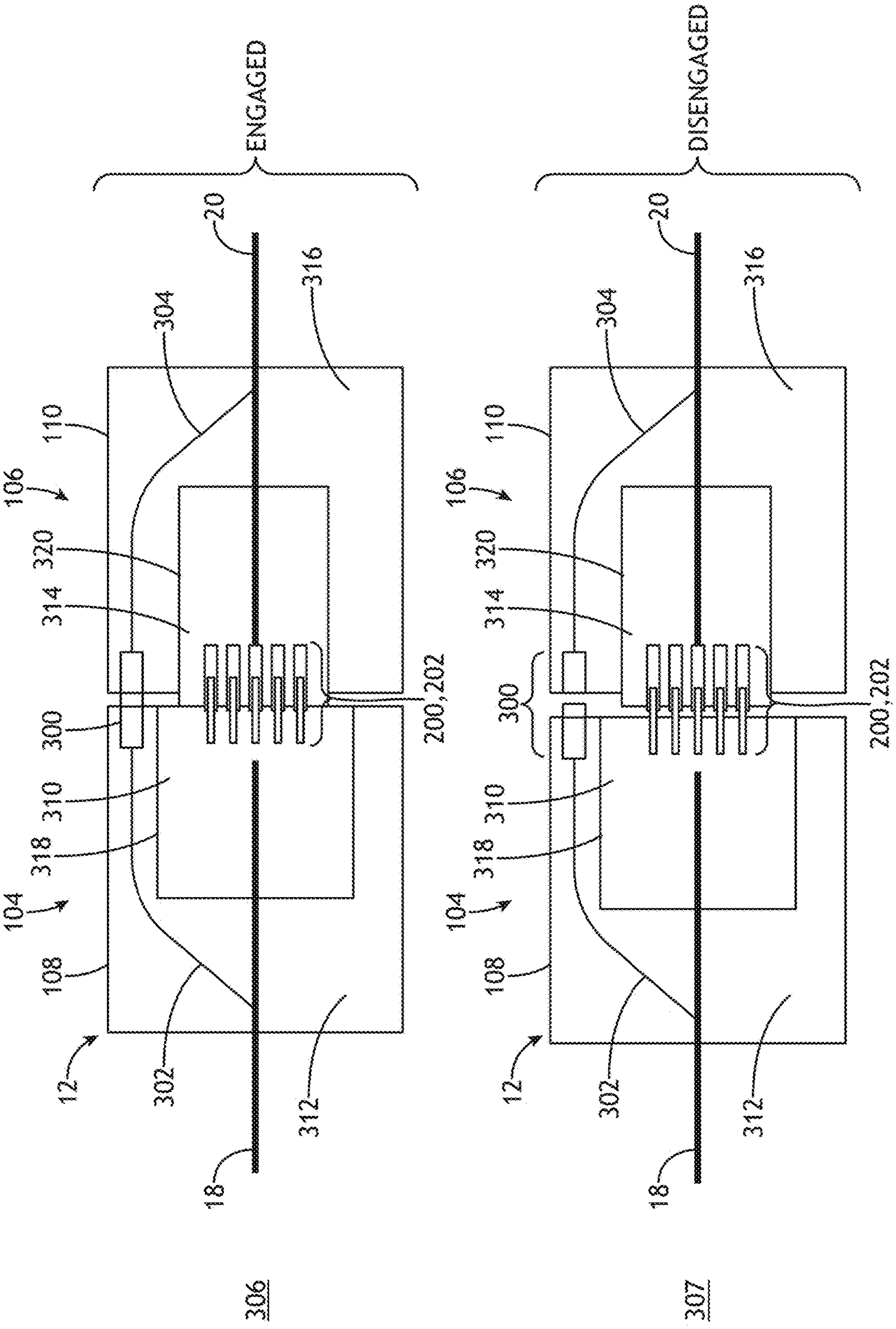
FIGS. 3A-3B illustrate simplified schematics view of connector assemblies with means to means to inhibit sparking and ignition in an explosive environment, in accordance with one or more embodiments of the disclosure.
Figure 3B:
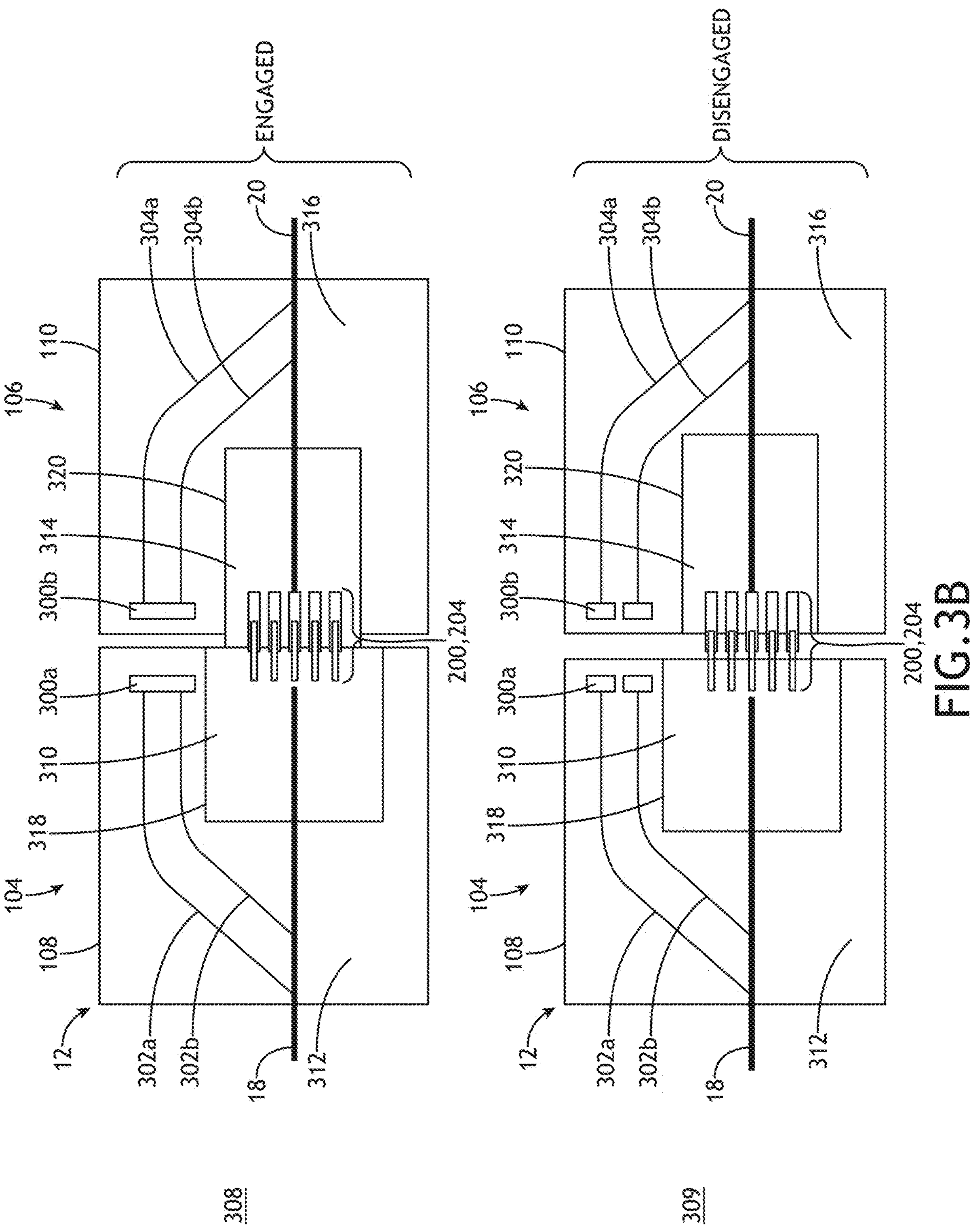

FIGS. 3A-3B illustrate schematics views of the inner plug housing 108 engaged and disengaged with the outer plug housing 112, with means to means to inhibit sparking and ignition in an explosive environment, in accordance with one or more embodiments of the disclosure. For example, and in embodiments, the connector assembly 12 includes a set of contacts 300 that are integrated within a safety circuit comprising safety lines 302, 304 that combine with the first cable 18 and second cable 20), as shown in FIG. 1A. The safety lines are configured to transmit a low voltage signal that will not cause a spark that will ignite an explosive atmosphere when the set of contacts 300 are moved from a closed position (e.g., allowing power to flow) to an open position (e.g., where the power is disrupted) when the connection assembly is disengaged.

The movement of the set of contact 300 from the closed position to the open position occurs before the first set of pins 200 are completely removed from the first set of sockets 202. For example, when the first set of pins 200 are fully engaged with the first set of sockets 202, the set of contacts 300 is configured in a closed position, with low voltage power flowing through the safety lines 302, 304, as shown in view 306. However, when the connector plug 104 and the connector receptacle 106 begin to be pulled apart, the set of contacts 300 is moved to an open position (e.g., shown as a bifurcated set of contacts 300) without causing ignition, while the first set of pins 200 are still engaged with the first set of sockets 202, as shown in view 307. In this configuration, the safety lines 302, 304 no longer carry the low voltage power, and the first device 14 and/or the second device will begin powering down or de-energizing the first cable 18 and/or the second cable 20 to prevent any pins within the first set of pins 200 from sparking and causing ignition of an explosive atmosphere when the first set of pins 200 are fully withdrawn from the first set of sockets 202.

In embodiments, the connector plug 104, the connector receptacle 106, or both the connector plug 104 and the connector receptacle 106 include a respective set of contacts 300*a-b* that can switch between open and closed positions, controlling low voltage to respective safety lines 302*a-b*, 304*a-b* and the respective first device 14 and the second device 16, as shown in FIG. 3B. In this configuration of the connection assembly 12 one or more, or each of the connector plug 104 and the connector receptacle 106 each have their own safety circuit comprising the safety lines 302*a-b* and 304*a-b*. When the connector plug 104 is fully engaged with the connector receptacle 106 the first set of pins 200 are engaged with the first set of sockets 202, and each set of the set of contacts 300*a-b* is engaged in a closed position, allowing low voltage to flow through the safety lines 302*a-b*, 304*a-b*, as shown in view 308. Upon a movement of one or both of the set of contacts 300*a-b* from an open position to a closed position (e.g., as indicated by the bifurcated set of contacts 300*a-b* in view 309), one, or both of the safety circuits are interrupted, and no low voltage signal is sent to the first device 14 and/or second device 16. However, the first set of pins 200 is still engaged with the first set of sockets 202. The first device 14 and/or second device 16 detects that the low voltage signal through the safety lines 302, 304 has ceased, and will begin powering down or de-energizing the first cable 18 and/or the second cable 20 to prevent any pins within the first set of pins 200 from sparking and causing ignition of an explosive atmosphere when the first set of pins 200 are fully withdrawn from the first set of sockets 202.

In embodiments, the inner plug housing 108 includes an inner plug ring 310 that houses the connection elements (e.g., the first set of pins 200) required for connectivity between the first cable 18 and the second cable 20, and an outer plug ring 312 that houses one or more contacts 300 of the set of contacts 300. Similarly, and in embodiments, the inner receptacle housing 110 includes an inner receptacle ring 314 that houses the connection elements (e.g., the first set of sockets 202) required for connectivity between the first cable 18 and the second cable 20, and an outer receptacle ring 316 that houses one or more contacts of the set of contacts 300.

In embodiments, the inner plug ring 310 and the outer plug ring 312 are configured to move independently relative to each other. For example, the inner plug ring 310 and the outer plug ring 312 may be configured to rotate and/or translate relative to each other at a plug ring interface 318. For instance, the movement of the inner plug ring 310 relative to the outer plug ring 312 may cause the set of contacts 300 to move from the closed position to the open position.

Similarly, and in embodiments, the inner receptacle ring 314 and the outer receptacle ring 316 are configured to move independently relative to each other. For example, the inner receptacle ring 314 and the outer receptacle ring 316 may be configured to rotate and/or translate relative to each other at a receptacle ring interface 320. For instance, the movement of the inner receptacle ring 314 relative to the outer receptacle ring 316 may cause the set of contacts 300 to move from the closed position to the open position.

Figure 4A:
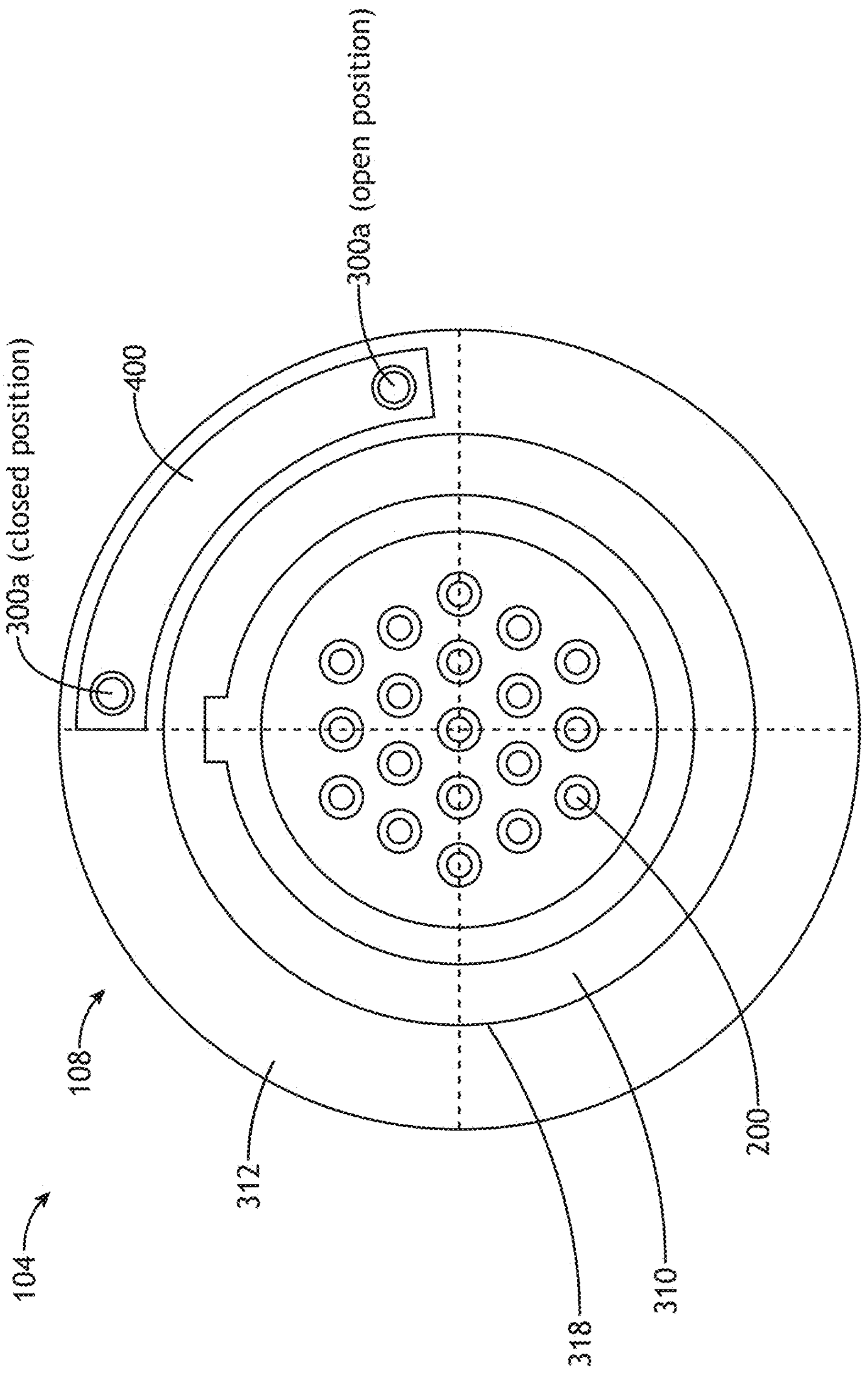
FIGS. 4A-4C illustrate plan views of the connector plug, with means to inhibit sparking and ignition in an explosive environment, in accordance with one or more embodiments of the disclosure.
Figure 4B:
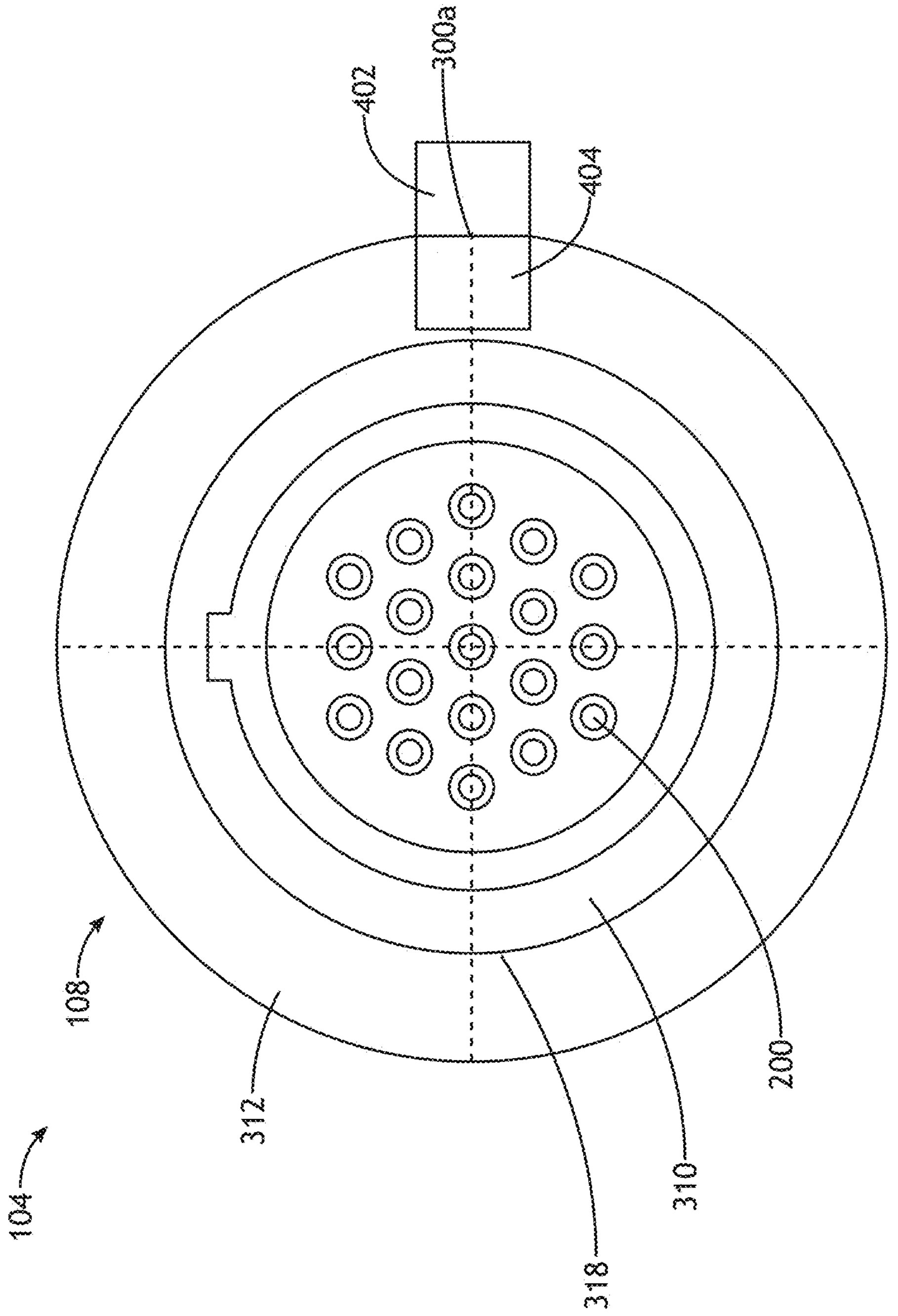
Figure 4C:
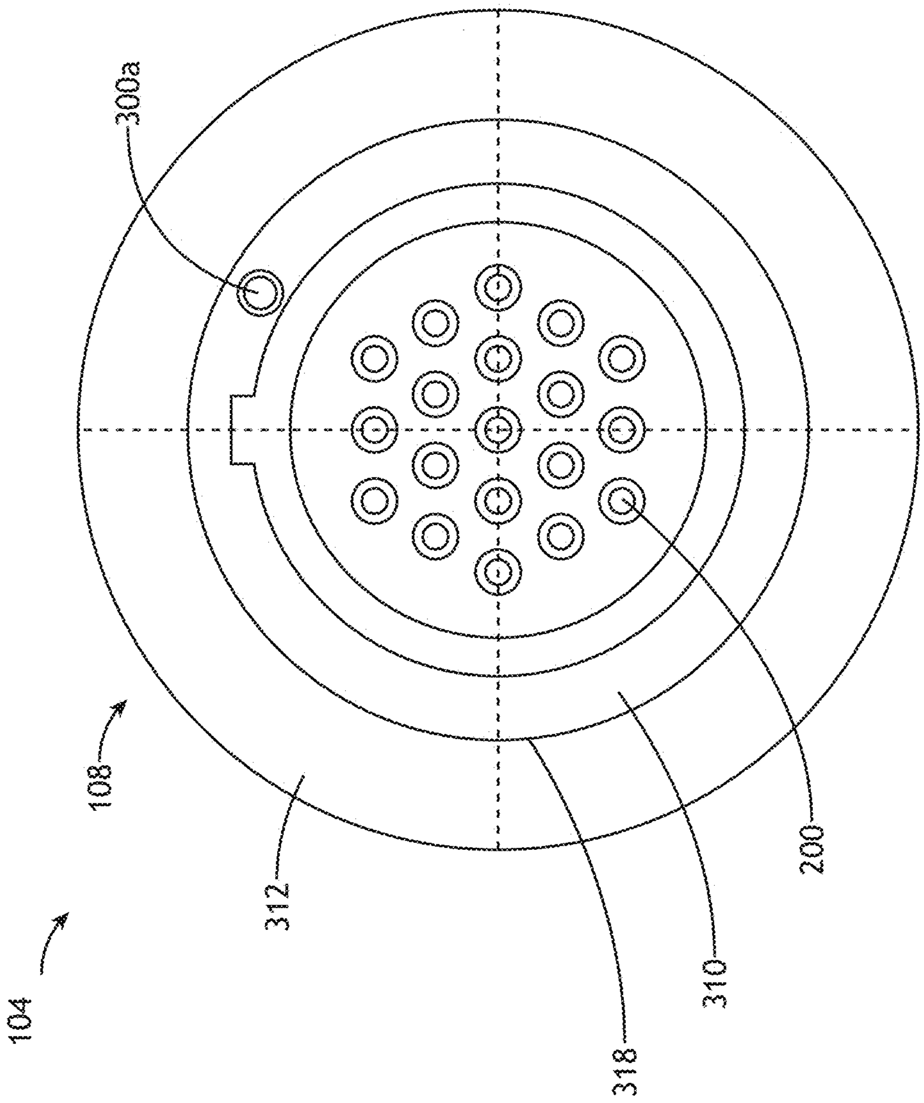

FIGS. 4A-4C illustrate plan views of the connector plug 104, with means to inhibit sparking and ignition in an explosive environment, in accordance with one or more embodiments of the disclosure. It should be noted that while the means to inhibit sparks and ignition are depicted on the connector plug 104, the means may also be reversed or duplicated, such that the means to inhibit sparks and ignition may be integrated within the connector receptacle 106.

In embodiments, the inner plug ring 310 is configured to rotate relative to the outer plug ring 312, wherein a rotation of the outer plug ring 312 articulates the at least one contact 300*a* of the set of contacts 300 from a closed position to an open position, as shown in FIG. 4A. For example, the at least one contact 300*a* may be configured as a pin (e.g., distinct from the first set of pins 200) that is located in the outer plug ring 312. When the inner plug housing 108 is mated with the inner receptacle housing 110 and the first set of pins 200 is fully engaged with the first set of sockets 202, the outer plug ring 312 outer plug ring 312 may be rotated (e.g., via QDC threads) so that the at least one contact 300*a* is moved (e.g., articulated) from the open position to the closed position (e.g., into an interaction with another contact 300 of the set of contacts that completes the safety circuit), allowing low voltage power to flow through the safety lines 302, 304. When the outer plug ring 312 is loosened relative to the inner plug ring 310 (e.g., by pulling on the connector receptacle 104, which rotates the outer plug ring 312 relative to the inner plug ring 310 approximately % turn), the at least one contact 300*a* is articulated from the closed position onto an open position that includes a non-conductive region 400, breaking the safety circuit and preventing low voltage from flowing through the safety lines 302, 304. In this configuration, the outer plug housing 112 can include two or more contacts 300*a*.

In embodiments, the QDC threads or other QDC mechanism connecting the outer plug ring 312 to the inner plug ring 310 may be disengaged via pulling the first cable 18, pulling the second cable, pulling a lanyard coupled to the connector plug 104 or the connector receptacle 106, or by otherwise applying tension between the connector plug 104 and the connector receptacle 106. For example, by providing between the connector plug 104 and the connector receptacle 106, the outer plug ring 312 is rotated relative to the inner plug ring 310, articulating or translating the at least one contact 300*a* from the closed position to the open position. The safety circuit is then broken, causing the first set of pins 200 to be de-energized before the applied tension further disengages the first set of pins 200 from the first set of sockets 202. This allows a cable (e.g., first cable 18 or second cable 20) or a lanyard to be pulled and the connector assembly 12 safely released without the operator (e.g., pilot) needing to grip the connector assembly 12 for emergency egress.

In embodiments, the connector plug 104 includes a manually pressable button 402 coupled to the at least one contact 300 of the set of contacts (e.g., via a release mechanism 404), wherein pressing the button 402 biases the at least one contact 300*a* of the set of contacts 300 from a closed position to an open position, as shown in FIG. 4B. The connector plug 104 may then be pulled away or unscrewed from the connector receptacle 106 without sparking. Pressing the button 402 on the connector plug 104 (e.g., or connector receptacle 106) may also allow the connector assembly 12 to be mechanically unlocked via the release mechanism. For example, the release mechanism may include a spring-loaded lock that prevents mechanical separation of the connector plug 104 from the connector receptacle. The button type, button size, and button force of the button 402 and the type and/or style of the release mechanism 404 can be customed to the specific application.

In embodiments, the connection assembly includes a contact 300*a* (e.g., a first safety element) of the set of contacts that acts as a contact pin and another contact 300 (e.g., a second safety element) that acts as a contact socket to the contact pin, where a length of insertion of the contact pin into the safety socket is less than a length of insertion of the first set of pins with the first set of sockets. For example, the contact 300*a* may be configured as a fuzz Button™ or other specialty connector having a considerably shorter pin length than the pins of the first set of pins 200. The contact 300*a* is then matched to an equally shallow socket. In this configuration, the distance that the contact has to travel moving from the closed position to the open position is substantially smaller than the distance the first set of pins 200 has to move to disengage from the first set of sockets 202 (e.g., from the closed position to open position). Because of this, upon disengaging the connector plug 104 from the connector receptacle 106, the contact 300*a* is released from its corresponding socket first, allowing enough time for the first device 14 and/or second device 16 to detect as loss of power in the safety circuit and de-energize the first set of pins 200 before the first set of pins 200 disengage from the first set of sockets.

Figure 5:
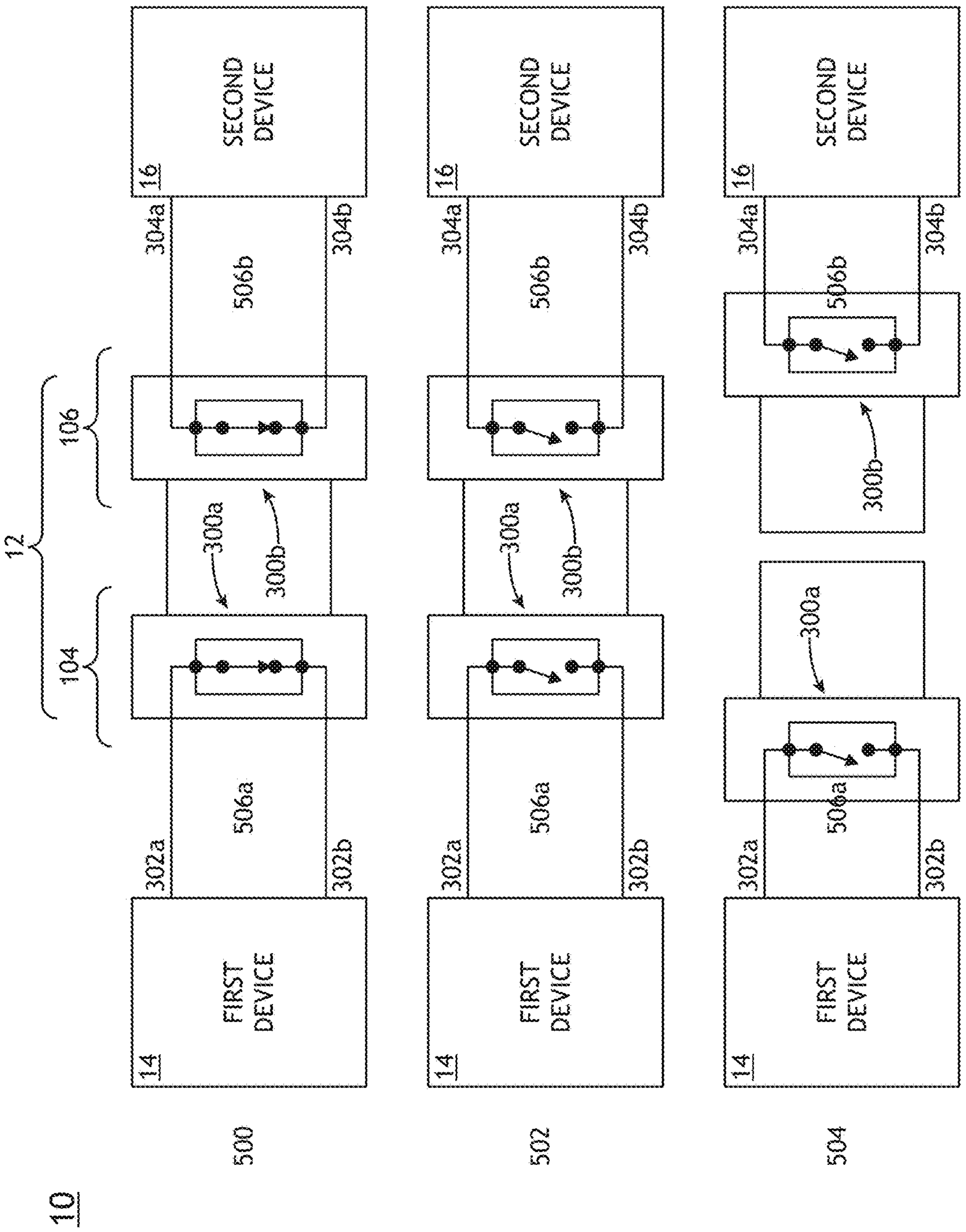
FIG. 5 illustrates a block diagram depicting scenes that summarize the open and closed configurations of the system, in accordance with one or more embodiments of the disclosure.

FIG. 5 illustrates a block diagram depicting scenes 500, 502, and 504 that summarize the open and closed configurations of the system 12, in accordance with one or more embodiments of the disclosure. In each scene, the connector plug 104 and the connector receptacle 106 each include a respective contact 300*a-b* of the set of contacts and a respective safety circuit 506*a-b* (e.g., each safety circuit 506*a-b* monitored by the first device 14 and/or second device 16. For example, when the connector plug 104 is mated with the connector receptacle 106 and the first set of pins 200 are fully engaged with the first set of sockets 202, the respective contacts 300*a-b* are positioned in the closed position, allowing low voltage power to flow through the safety circuits 506*a-b*, as shown in scene 500. When the disengagement of the connector plug 104 from the connector receptacle 106 is initiated, the respective contacts are moved to an open position, and power through the safety circuits 506*a-b* is stopped, which is detected by the first device 14 and the second device, resulting in the first device 14 and/or the second device working to de-energize so that no power flows through the first set of pins 200, as shown in scene 502. After the first set of pins is de-energized, further disengagement and separation of the connector plug 104 from the connector receptacle (e.g., via tension) disengages the first set of pins 200 from the first set of sockets 202 without any risk of spark that could ignite an explosive atmosphere, as shown in scene 504.

Figure 6:
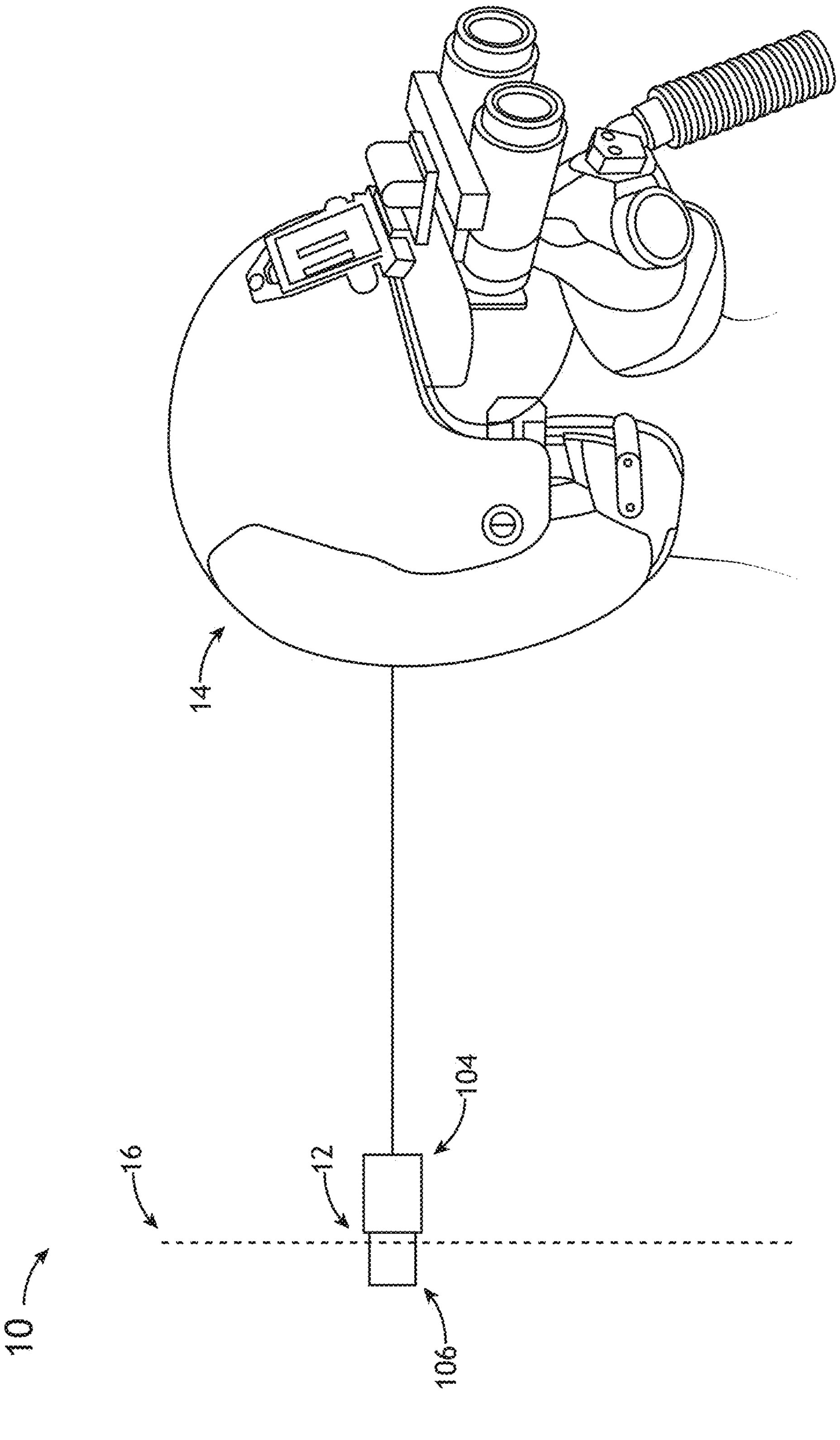
FIG. 6 is a drawing depicting an example of the system, in accordance with one or more embodiments of the disclosure.

FIG. 6 is a drawing depicting an example of the system 10, in accordance with one or more embodiments of the disclosure. The system 10 includes a first device 14 (e.g., a helmet vehicle interface (HVI) coupled to a second device 16 (e.g., an instrument panel) via the connection assembly 12. A connector plug 104 of another connection assembly 12 that could be used to electrically couple the HVI and/or battery to a third device, such as a console.

Figure 7:
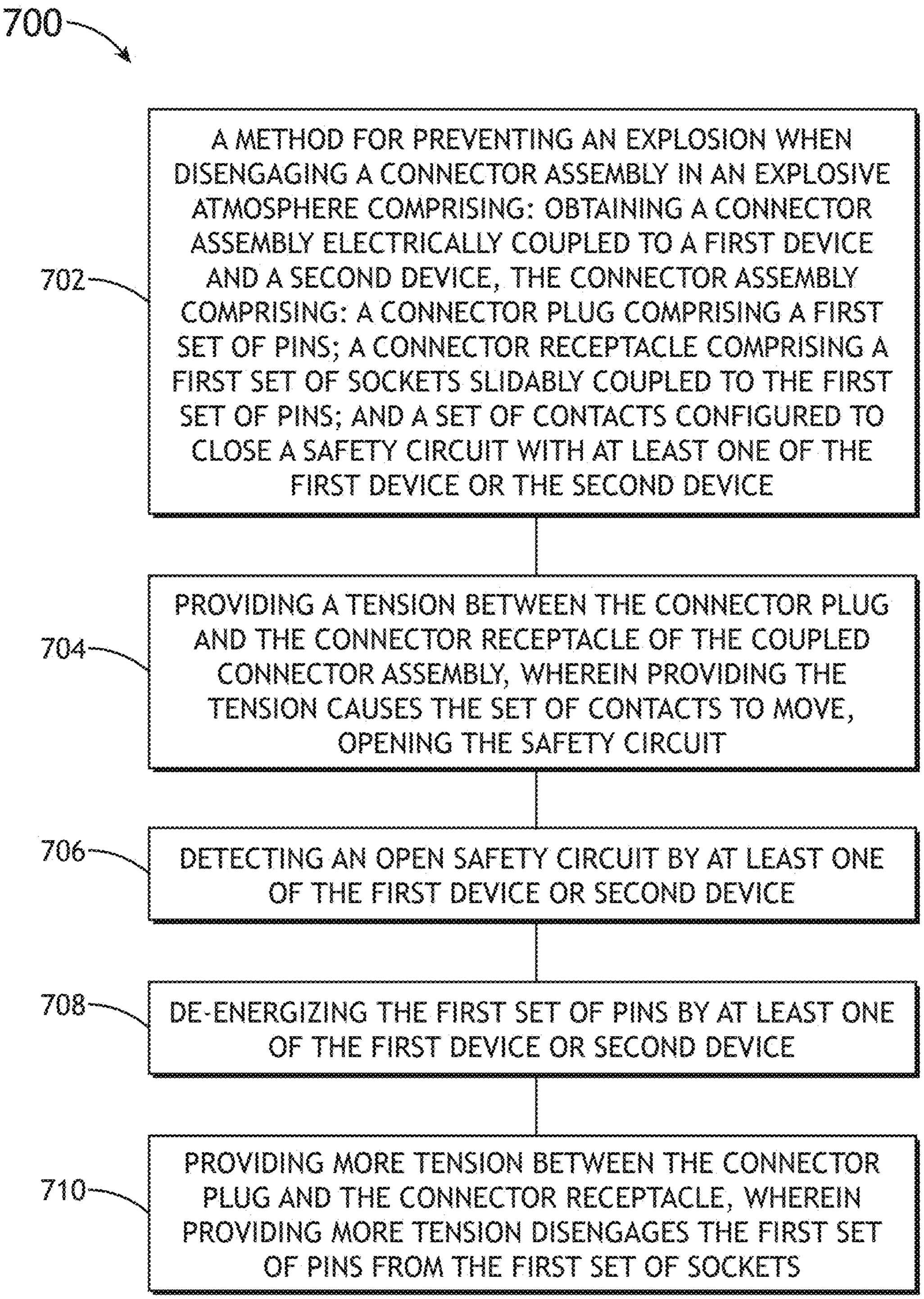
FIG. 7 illustrates a process flow diagram depicting a method for preventing an explosion when disengaging a connector assembly in an explosive atmosphere, in accordance with one or more embodiments of the disclosure.

FIG. 7 is a flowchart of a method 700 for preventing an explosion when disengaging a connector assembly in an explosive atmosphere.

In embodiments, the method 700 includes a step 702 of obtaining a connector assembly 12 electrically coupled to a first device 14 and a second device 16, the connector assembly 12 including a connector plug 104 comprising a first set of pins 200, a connector receptacle comprising a first set of sockets 202 slidably coupled to the first set of pins 200; and a set of contacts 300 configured to close a safety circuit 506 with at least one of the first device or the second device.

In embodiments, the method 700 includes a step 704 of providing a tension on the connector plug 14 and the connector receptacle 106 of the coupled connector assembly 12, wherein providing a tension causes the set of contacts 300 to move, opening the safety circuit 506. In embodiments, the method 700 includes a step 706 of detecting an open safety circuit 506 by at least one of the first device 14 or second device 16. In embodiments, the method 700 includes a step 708 of de-energizing the first set of pins 200 by at least one of the first device 14 or the second device 16.

In embodiments, the method 700 includes a step 710 of providing more tension on the connector plug and the connector receptacle, wherein providing more tension disengages the first set of pins 200 from the first set of sockets 202. Because the first set of pins 200 and the first set of sockets 202 are de-energized when they disengage, there is no risk of spark for igniting an explosive atmosphere.

The one or more processors 24*a-b* of controller 22*a-b* may include any one or more processing elements known in the art. In this sense, the one or more processors 24*a-b* may include any microprocessor-type device configured to execute software algorithms and/or instructions. In embodiments, the one or more processors 24*a-b* may consist of a desktop computer, mainframe computer system, workstation, image computer, parallel processor, or other computer system (e.g., networked computer) configured to execute a program configured to operate the system 10, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 26*a-b*. Moreover, different subsystems of the system 10 may include a processor or logic elements suitable for carrying out at least a portion of the steps described throughout the present disclosure.

The memory medium 26*a-b* may include any memory medium known in the art suitable for storing program instructions executable by the associated one or more processors 24*a-b*. For example, the memory medium 26*a-b* may include, but is not limited to, a read-only memory, a random-access memory, a magnetic or optical memory device (e.g., disk), a magnetic tape, a solid-state drive, and the like. It is further noted that memory medium 26*a-b* may be housed in a common controller housing with the one or more processors 24*a-b*. In an alternative embodiment, the memory medium 26*a-b* may be located remotely with respect to the physical location of the processors and controller 22*a-b*. For instance, the one or more processors 24*a-b* of the controller a-b may access a remote memory (e.g., server), accessible through a network (e.g., internet, intranet and the like).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:

a connector assembly configured to electrically couple a first device with a second device, the connector assembly comprising:

a first connector side configured to engage with a second connector side, the first connector side comprising:

an inner plug ring comprising a first set of first connector elements configured to engage a first set of second connector elements of the second connector side; and an outer plug ring comprising a set of contacts, wherein the set of contacts is configured to close a safety circuit with at least one of the first device or the second device when the first set of first connector elements engage the first set of second connector elements, whereupon disengaging the first connector side from the second connector side, the safety circuit is opened by a movement of at least one contact of the set of contacts before the first set of first connector elements disengage the first set of second connector elements.

2. The system of claim 1, wherein the safety circuit is a low voltage circuit that is monitored by at least one of the first device or the second device, wherein an opening of the safety circuit is detectable by the at least one of the first device or second device, wherein the at least one of the first device or the second device are configured to turn off power to the first set of first connector elements upon detecting an opening of the safety circuit.

3. The system of claim 2, wherein power to the first set of first connector elements is turned off before the first set of first connector elements physically disengages the first set of second connector elements.

4. The system of claim 3, wherein an opening of the safety circuit by the movement of the at least one contact of the set of contacts will not cause an explosion in an explosive atmospheric environment.

5. The system of claim 1, wherein the outer plug ring is configured to rotate relative to the inner plug ring, wherein a rotation of the outer plug ring articulates the at least one contact of the set of contacts from a closed position to an open position.

6. The system of claim 5, wherein the outer plug ring and an outer receptacle ring of the second connector side are configured to engage via a screw thread after the first set of first connector elements engages the first set of second connector elements, wherein engaging the screw thread articulates the at least one contact of the set of contacts from the open position to the closed position.

7. The system of claim 6, wherein applying tension between an engaged first connector side and second connector side causes the articulation of the at least one contact from the closed position to the open position.

8. The system of claim 1, wherein the first connector side further includes a manually pressable button mechanically coupled to the at least one contact of the set of contacts, wherein pressing the button biases the at least one contact of the set of contacts from a closed position to an open position.

9. The system of claim 1, wherein at least one contact of the set of contacts comprises a first safety element that engages a second safety element of the second connector side, where a length of insertion of the first safety element into the second safety element is less than a length of insertion of the first set of first connector elements with the first set of second connector elements.

10. The system of claim 1, where the connector assembly is configured to replace a D38999 insert while retaining the functionality of the replaced D38999 insert.

11. The system of claim 1, further including the second connector side.

12. The system of claim 11, further including at least one of the first device or second device.

13. The system of claim 12, wherein the at least one of the first device or the second device further includes a controller communicatively coupled to the safety circuit and the first set of first connector elements, the controller including one or more processors, wherein the one or more processors are configured to execute a set of program instructions stored in memory, the set of program instructions configured to cause the one or more processors to:

detect a status of the safety circuit; and upon a detection of an open safety circuit, turn off power to the first set of first connector elements.

14. The system of claim 1, wherein the at least one of the first device or the second device includes a helmet vehicle interface.

15. An electrical system comprising:

a first device;

a second device, wherein the at least one of the first device or the second device further includes a controller communicatively coupled to a safety circuit and a first set of first connector elements, the controller including one or more processors, wherein the one or more processors are configured to execute a set of program instructions stored in memory;

a connector assembly configured to electrically couple the first device with the second device, the connector assembly comprising:

a first connector side configured to engage with a second connector side, the first connector side comprising:

an inner plug ring comprising the first set of first connector elements configured to engage a first set of second connector elements of the second connector side; and an outer plug ring comprising a set of contacts, wherein the set of contacts are configured to close the safety circuit with at least one of the first device or the second device when the first set of first connector elements engage the first set of second connector elements, whereupon disengaging the first connector side from the second connector side, the safety circuit is opened by a movement of at least one contact of the set of contacts before the first set of first connector elements disengage the first set of second connector elements, wherein the set of program instructions configured to cause the one or more processors to:

detect a status of the safety circuit; and upon a detection of an open safety circuit, turn off power to the first set of first connector elements.

16. The electrical system of claim 15, wherein the safety circuit is a low voltage circuit, wherein power to the first set of first connector elements is turned off before the first set of first connector elements physically disengages the first set of second connector elements, wherein an opening of the safety circuit by the movement of the at least one contact of the set of contacts will not cause an explosion in an explosive atmospheric environment.

17. The electrical system of claim 15, wherein the outer plug ring is configured to rotate relative to the inner plug ring, wherein a rotation of the outer plug ring articulates the at least one contact of the set of contacts from a closed position to an open position, wherein the outer plug ring and an outer receptacle ring are configured to engage via a screw thread after the first set of first connector elements engage the first set of second connector elements, wherein engaging the screw thread articulates the at least one contact of the set of contacts from the open position to the closed position, wherein applying tension to an engaged first connector side and second connector side causes a disengaging of the screw thread and an articulation of the at least one contact from the closed position to the open position.

18. The electrical system of claim 15, wherein the first connector side further includes a manually pressable button mechanically coupled to the at least one contact of the set of contacts, wherein pressing the button biases the at least one contact of the set of contacts from a closed position to an open position.

19. The electrical system of claim 15, wherein at least one contact of the set of contact comprises a first safety element that is that engages a second safety element of the second connector side, where a length of insertion of the first safety element into the second safety element is less than a length of insertion of the first set of first connector elements with the first set of second connector elements.

20. A method for preventing an explosion when disengaging a connector assembly in an explosive atmosphere comprising:

obtaining a connector assembly electrically coupled to a first device and a second device, the connector assembly comprising:

a first connector side comprising a first set of first connector elements;

a second connector side comprising a first set of second connector elements slidably coupled to the first set of first connector elements; and a set of contacts configured to close a safety circuit with at least one of the first device or the second device;

providing a tension between the first connector side and the second connector side of the coupled connector assembly, wherein providing the tension causes the set of contacts to move, opening the safety circuit;

detecting an open safety circuit by at least one of the first device or second device;

de-energizing the first set of first connector elements by at least one of the first device or second device; and providing more tension between the first connector side and the second connector side, wherein providing more tension disengages the first set of first connector elements from the first set of second connector elements.

* * * * *